(12) United States Patent
Goulet et al.

(10) Patent No.: US 6,379,489 B1
(45) Date of Patent: Apr. 30, 2002

(54) CARPET RECLAMATION PROCESS

(75) Inventors: Roger Joseph Goulet, Bulrington; Peter Michael Ramsden, Milton, both of (CA); Jerauld Lee Dickerson, Pensacola; Susan Ramilo Williams, Pace, both of FL (US)

(73) Assignee: Monsanto Company, St. Louis, MO (US)

( * ) Notice: Subject to any disclaimer, the term of this patent is extended or adjusted under 35 U.S.C. 154(b) by 1017 days.

(21) Appl. No.: 08/825,204

(22) Filed: Mar. 27, 1997

Related U.S. Application Data

(63) Continuation-in-part of application No. PCT/US95/12186, filed on Sep. 26, 1995.

(30) Foreign Application Priority Data

Sep. 26, 1994 (CA) ............................................. 2133303
Sep. 26, 1995 (WO) ................................ PCT/US95/12186

(51) Int. Cl.[7] ............................................. B32B 35/00
(52) U.S. Cl. ........................ 156/344; 156/584; 241/21; 241/39; 264/37.28

(58) Field of Search ......................... 156/344, 94, 584; 264/37.28; 241/21, 39, 46.01

(56) References Cited

U.S. PATENT DOCUMENTS

| | | | |
|---|---|---|---|
| 4,028,159 A | * 6/1977 | Norris | 264/37 X |
| 5,169,870 A | * 12/1992 | Corbin et al. | 521/49.8 |
| 5,227,085 A | 7/1993 | Motsenbocker | 252/99 |
| 5,230,473 A | * 7/1993 | Hagguist et al. | 241/3 |
| 5,518,188 A | * 5/1996 | Sharer | 241/14 |
| 5,535,945 A | * 7/1996 | Sferrazza et al. | 241/24.12 |
| 5,598,980 A | * 2/1997 | Dilly-Louis et al. | 241/20 |
| 5,719,198 A | * 2/1998 | Young et al. | 521/40.5 |
| 5,722,603 A | * 3/1998 | Costello et al. | 241/20 |

* cited by examiner

*Primary Examiner*—Mark A. Osele
(74) *Attorney, Agent, or Firm*—Howrey Simon Arnold & White, LLP

(57) ABSTRACT

A process for the reclamation of base materials from carpet is disclosed. The process includes contacting the carpet with a composition which contains a chemical softening agent for the binder material in the carpet and separating the carpet pile from the carpet backing(s).

7 Claims, 2 Drawing Sheets

CARPET RECLAMATION PROCESS

This is a continuation-in-part of an International Application, Serial No.: PCT/US 95/12186 having an international filing date of Sep. 26, 1995 which is a continuation-in-part of a Canadian patent application Serial No 2,133,303 filed on Sep. 29, 1994.

BACKGROUND OF THE INVENTION

1. Field of the Invention

The present invention is directed to an improved process for carpet reclamation and more particularly, the process is directed to the use of an agent for chemically softening or swelling binder material conventionally associated with carpet in order to expedite and simplify the reclamation process.

2. Description of the Prior Art

Carpet reclamation processes have been previously proposed in the art and are exemplified by the process disclosed in U.S. Pat. No. 5,230,473, issued to Hagguist et al., Jul. 27, 1993.

In the Hagguist et al. method, apart from introductory steps which involve screening the carpet, and preliminary loop cutting and other processing, the removal of the secondary backing involves a whole series of steps. This additionally is the situation when the binder material is to be removed from the primary backing.

In greater detail and with respect to the removal of the secondary backing from the carpet, the carpet must be initially exposed to fluids under pressure for loosening and debonding the latex binder from the secondary backing. The next step includes passing the remaining material onto a further processing stage where the secondary backing is mechanically treated with rotating mechanical impingement devices on both sides of the carpet. It is the mechanical arrangement that results in the removal of the secondary backing. At this time, the binder system is still substantially intact.

In order to remove the binder material, the remaining carpet structure must be passed to yet another stage where there is included a plurality of rotating brushes as well as rotating high pressure nozzle heads. This, as indicated by the patentees, results in the gradual loosening and removal of the binder system from the primary backing.

In view of the teachings of this reference, it is clear that the method is dependent on the use of mechanical means for the removal of not only the secondary backing, but further the removal of the latex binder conventionally positioned between the secondary backing and the primary backing.

The Hagguist et al. process also suffers the drawbacks common to all multiple step processes, including increased production time and cost, the use of a greater number of moving parts, the potential requirement for a larger labor force and difficulty in efficiently operating at a commercial level wherein, for example, millions of square meters of carpet may be processed.

In view of what has been proposed in the prior art set forth above, there clearly exists a need for a high efficiency method of reclaiming base components of a carpet quickly and without the use of toxic contaminants or complex, multiple stage processes.

BRIEF SUMMARY OF THE INVENTION

The present invention satisfies the above needs and achieves the results and benefits set forth below by providing a process for reclaiming carpet components, the carpet including backing material, binder material and carpet pile. In a first embodiment, the process includes the steps of: contacting the carpet with a composition including a chemical softening agent (as defined below) for the binder and separating the pile from the backing.

The amount of chemical softening agent in the composition and the conditions for the contacting step, for example temperature and time, may be selected to either substantially dissolve the binder or soften the binder.

In a second embodiment, the process includes reducing the size of the carpet to form a reduced carpet sample; combining at least a portion of the reduced carpet sample with a composition including a chemical softening agent for the binder to form a carpet/composition mixture; and applying to the mixture shear forces under turbulent conditions in an amount sufficient to promote detachment of the binder from the remaining materials (e.g., pile material and/or backing material).

The process and device of the present invention permits the reuse and recycle of the pile or backing material into critical end uses requiring a high degree of product purity such as, for example, carpet fibers, plastic pellets and other materials. Once the contacting step is complete, the various materials may be further separated from each other by making use of mechanical means, fluid means including air and liquid flow, vacuum means or by manual means.

According to yet another aspect of one embodiment of the present invention there is provided a system for reclaiming carpet components, the carpet including backing material, binding material and carpet pile, the system including: advancing means for advancing the carpet to a solvent application means; solvent application means for applying solvent to the carpet to dissolve the binder material; and collection means for collecting separated backing material and carpet pile.

It will be readily appreciated that the process as set forth herein is clearly applicable to all carpet types including, for example, standard carpet with styrene butadiene rubber latex binders and primary and secondary backings, and those with foam layers, including urethanes.

BRIEF DESCRIPTION OF THE DRAWINGS

Having thus generally described the invention, reference will be made below to the accompanying drawings illustrating preferred embodiments and in which.

DETAILED DESCRIPTION OF THE PREFERRED EMBODIMENTS

Figure 1:
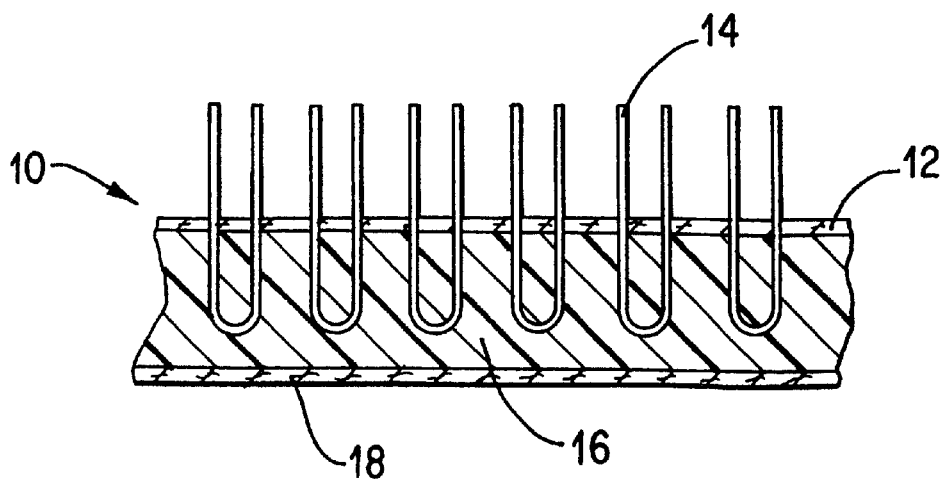
FIGS. 1 and 2 illustrate various types of carpeting in cross-section.
Figure 2:
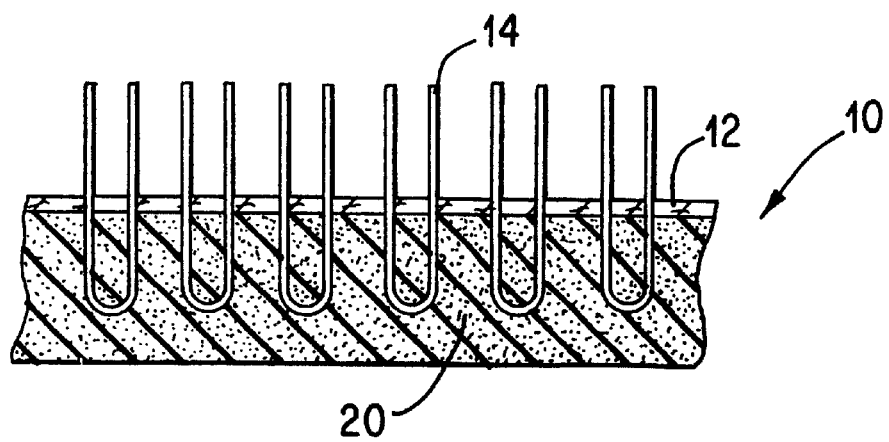

Referring now to the drawings, FIGS. 1 and 2 illustrate cross-sectional views of typical carpet varieties which are processable according to the present invention. In FIG. 1, the carpet 10 includes a primary backing 12 within which is disposed carpet pile 14. The carpet pile 14 is fixedly secured to backing 12 with binder 16, typically a latex binder. Preferably, a secondary backing 18 is additionally provided and is secured to primary backing 12 by binder 16.

FIG. 2 illustrates a second carpet type wherein the binder material 16 comprises a foam material 20 and the carpet 10 does not include a secondary backing.

While these carpet types are shown as exemplary of carpets processable according to the present invention, it will be appreciated by those skilled in the art that other types of carpeting may also be processed according to the present invention.

Prior to the performance of the process of the present invention, the carpet may be screened for processing suitability. The use of visual inspection, metal detectors, etc., may be employed to this end. Further, the carpet may be cleaned or preconditioned with, for example, a surface active agent or other compound(s) to enhance the processing thereof.

A first embodiment of the process of the present invention includes contacting the carpet with a composition which includes a chemical softening agent for the binder. The term "chemical softening agent", as utilized herein, is defined as any agent capable under specified conditions of softening or swelling a material, for example, a binder material, via chemical reaction or interaction therewith, for example, via interruption of the molecular forces in a polymeric matrix resulting in an opening of its structure. The specific chemical softening agent will therefore be selected based on the type and nature of the binder used in the carpet. The term "composition" is defined herein to include, without limitation, mixtures, solutions, emulsions, dispersions and the like.

The chemical softening agent preferably is non-toxic and environmentally friendly. A preferred chemical softening agent includes at least one dimethyl ester. Dimethyl adipate, dimethyl glutamate, dimethyl succinate and mixtures thereof are especially preferred. Particularly preferred chemical softening agents are dimethyl succinate and a mixture of dimethyl adipate and dimethyl glutarate. Suitable dimethyl esters are commercially available from Monsanto Company under the trade name SANTOSOL®.

Suitable compositions include aqueous or non-aqueous compositions of the chemical softening agent. In order to further enhance the dissolution or softening of the binder, additional chemicals may be added to the composition including, for example, surface active agents to enhance the wettability of the backing material of the carpet. In addition, thickeners may be added to control the flow and adhesive properties of the composition. A particularly useful thickener is commercially available from B. F. Goodrich under the trade name CARBOPOL®.

A preferred composition includes at least one dimethyl ester and water, most preferably in a weight ratio of about 1:1.

The concentration of chemical softening agent in the composition will vary greatly depending on the type of carpet and the conditions utilized in the contacting step such as, for example, time and temperature. Preferred chemical softening agent amounts are from at least about 10% by weight based on the total weight of the composition.

The contacting step may be performed by any method, including, for example, immersing the carpet in the composition, applying the composition to the pile or applying the composition to the backing. Preferably, the contacting step is performed in the presence of a surface active agent. The surface active agent may be added to the composition which contacts the carpet or it may be pre-applied to the carpet prior to the contacting step. Suitable surface active agents include, for example, anionic and nonionic surfactants.

The condition for the contacting step will vary greatly depending on, for example, the carpet type, type and concentration of chemical softening agent, and the like. Contact time will generally extend at least 5 seconds while the contact temperature may range from ambient temperatures to just below the boiling point of the composition. In a preferred embodiment wherein at least one dimethyl ester is utilized as the chemical softening agent, the contacting step is performed at a temperature of at least 20° C., more preferably at least 35° C.

Preferably, the concentration of softening agent is selected and the contacting step is performed under conditions sufficient to reduce the amount of force required to remove a tuft from the carpet by at least 50% according to the test set forth in the examples below.

In a preferred embodiment, the concentration of chemical softening agent is selected and the contacting step is performed under conditions sufficient to soften the binder. In this embodiment, the process of the present invention optionally includes removing binder from the pile after pile is separated from the backing.

Any residual composition present on the individual base components (pile and/or backing[s]) of the carpet may be removed by simply washing the components and this may additionally include pressurized washing making use of a suitable washing agent.

A preferred method for removing the binder material from the pile includes applying to the pile, preferably in the presence of the chemical softening agent, shear forces under turbulent conditions in an amount sufficient to detach the binder from the pile. It is to be understood that the amount of shear forces, the extent of the turbulence and the time required to detach the binder from the pile will vary depending on a number of factors, for example, the conditions under which the contacting step is performed, the conditions under which the force is applied, the strength of the attachment of the binder to the pile, and the type and composition of the binder.

In a second embodiment, the process of the present invention includes reducing the size of the carpet to form a reduced carpet material. The phrase "reducing the size", as utilized herein, is defined to include any known methods for decreasing the size of the carpet and/or its component parts to a size and form suitable for subsequent processing as set forth below. The reduced carpet material includes pile material typically with at least some binder material attached thereto and/or backing material typically with at least some binder material attached thereto.

This size reduction step can be suitably performed by any of the common and commercially available attrition devices known to one of ordinary skill in the art, for example cutters, shredders, fiberizers, wet attrition devices, hammer mills, particulate grinders, knife mills, and similar devices as well as combinations thereof. It will be understood by one of ordinary skill in the art that, depending upon the specific methods and devices utilized for this size reduction step, the resulting reduced carpet sample can but may not necessarily retain the structural form of the original carpet.

In those situations where the carpet pile and the carpet backing material are made from dissimilar polymeric materials, the process preferably further includes, separating the reduced carpet material into a first stream primarily including pile material and a second stream primarily including backing material. Most preferably, this step is performed prior to the combining step below such that both of these streams will contain at least some amount of binding entrained in the stream and/or attached to the stream's primary component. This separation step can be suitably performed by any of the common and commercially available mechanical separation devices known to one of ordinary skill in the art, for example cyclones, air separators, hydrocyclones, centrifuges, and similar devices or combinations thereof.

The next step includes combining at least a portion of the reduced carpet material with a composition including a chemical softening agent for the binder to form a carpet/composition mixture.

The chemical softening agent preferably is non-toxic and environmentally friendly. A preferred chemical softening agent includes at least one dimethyl ester. Dimethyl adipate, dimethyl glutamate, dimethyl succinate and mixtures thereof are especially preferred. Particularly preferred chemical softening agents are dimethyl succinate and a mixture of dimethyl adipate and dimethyl glutarate. Suitable dimethyl esters are commercially available from Monsanto Company under the trade name SANTOSOL®.

Suitable compositions include aqueous or non-aqueous compositions of the chemical softening agent. In order to further enhance the dissolution or softening of the binder, additional chemicals may be added to the composition including, for example, surface active agents to enhance the wettability of the backing material of the carpet. In addition, thickeners may be added to control the flow and adhesive properties of the composition. A particularly useful thickener is commercially available from B. F. Goodrich under the trade name CARBOPOL®.

A preferred composition includes at least one dimethyl ester and water, most preferably in a weight ratio of about 1:1.

The concentration of chemical softening agent in the composition will vary greatly depending on the type of carpet and the conditions utilized in the contacting step such as, for example, time and temperature. Preferred chemical softening agent amounts are from at least about 10% by weight based on the total weight of the composition.

The combining step may be performed by any method, including, for example, immersing or mixing the ground carpet in the composition, soaking the ground carpet with the composition or applying the composition to the ground carpet by spray or similar means. Preferably, the combining step is performed in the presence of a surface active agent. Suitable surface active agents include, for example, anionic and nonionic surfactants.

The condition for the combining step will vary greatly depending on, for example, the carpet type, type and concentration of chemical softening agent, and the like. Contact time will generally extend at least 5 seconds while the contact temperature may range from ambient temperatures to just below the boiling point of the composition. In a preferred embodiment wherein at least one dimethyl ester is utilized as the chemical softening agent, the contacting step is performed at a temperature of at least 20° C., more preferably at least 35° C.

In a particularly preferred embodiment, the process includes applying to at least a portion of the carpet/composition mixture shear forces under turbulent conditions. The shear forces and turbulence are present in an amount sufficient to promote detachment of any binder attached to the tuft material and/or backing material. It is to be understood that the amount of shear forces and turbulence and the force application time required to detach the binder from the material will vary depending on a number of factors, for example the conditions under which the combining step is performed, the conditions under which the force is applied, the strength of the attachment of the binder, and the type and composition of the binder.

Subsequent to the shear force application step, the treated carpet material may be further processed. For example, the treated carpet material may be washed or cleaned, preferably with water, lower alcohols such as methanol or mixtures thereof. Similarly, the composition may also be further processed, for example by purification or recovery thereof for reuse or by removal of the softened or swelled binder material therefrom.

Figure 3:
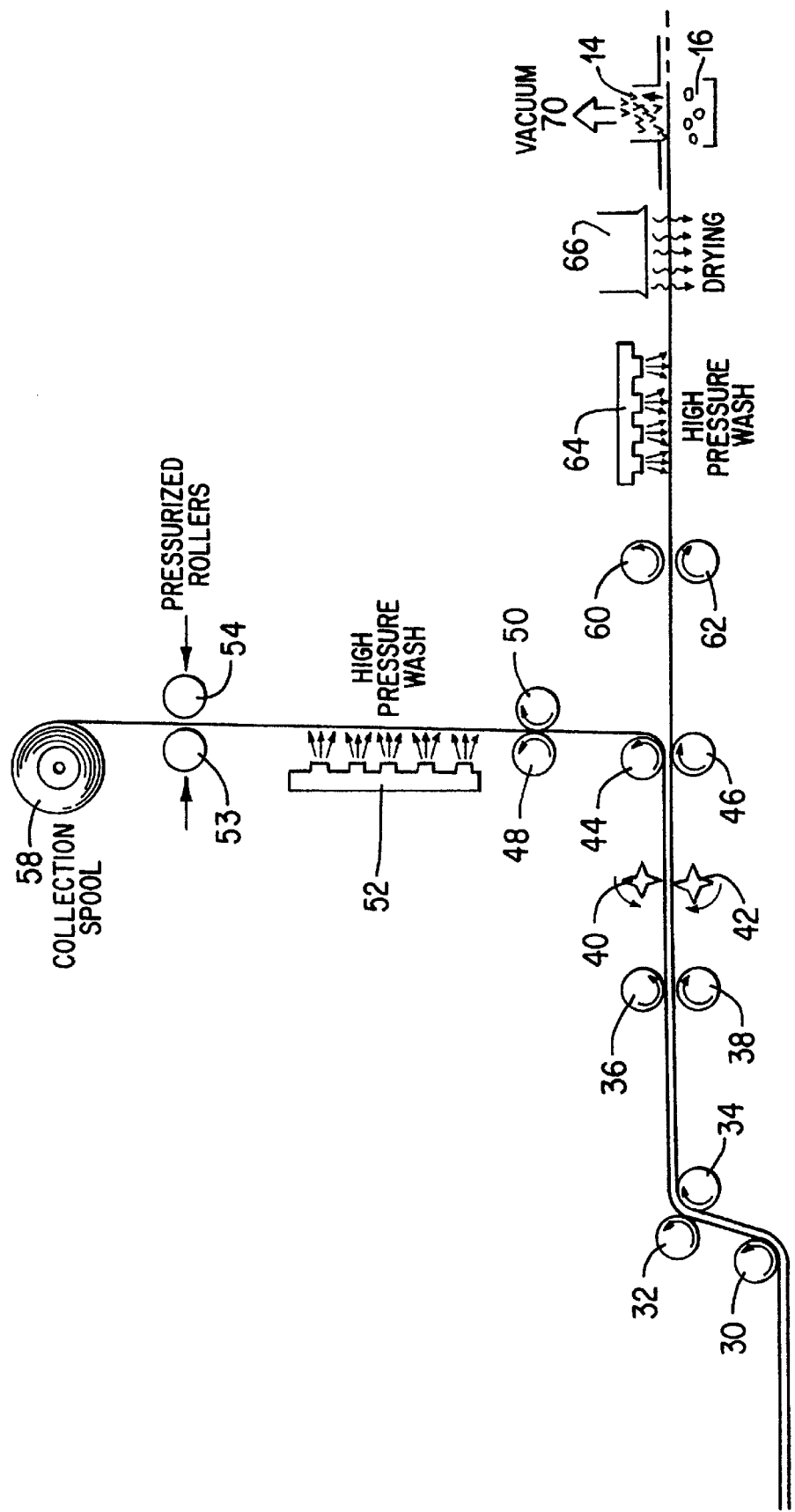
FIG. 3 is a schematic illustration of the process according to one embodiment of the present invention.

Turning to FIG. 3, which illustrates a schematic illustration of a device suitable for practicing one embodiment of the process of the invention for processing the carpet of FIG. 1, a first roller 30 advances the carpet material to a first pair of liquid nip rollers 32 and 34. First set of rollers 32 and 34 include the composition for application onto the secondary backing 18 of the carpet 10. The composition is preferably heated such that the contacting step is conducted at a temperature of at least 35° C. A second set of rollers 36 and 38 further apply additional amount of the composition through the secondary backing into the binder material of the carpet.

The carpet is then passed between two star wheels 40 and 42 which mechanically loosen the secondary backing from the carpet passing therethrough. At this point, the secondary backing is effectively removed from the carpet and to this end, an abrasive roll 44 is provided and further acts on a smooth roll 46 to remove the secondary backing from the carpet. The removed secondary backing may be passed on through rollers 48 and 50 to a high pressure wash, globally denoted by numeral 52, optionally dried by pressure rollers 54 and 56 and collected on a spool 58 for subsequent usage.

Once the secondary backing 18 has been completely removed, the primary backing 12, together with the pile 14 and binder 16, are further treated with the solvent using a nip roller arrangement 60 and 62 in a similar manner as set forth with respect to nips 32 and 34. After a suitable dwell time, the remaining material is subjected to a high pressure water wash at 64 in order to remove any residual binder from the primary backing along with any remaining solvent. After entering the washing cycle 64, the primary backing and carpet pile is then dried in a drying cycle at 66 using any suitable means for effectively drying, e.g. forced hot air.

In order to remove the carpet pile 14 from the primary backing 12, once dried, the primary backing and carpet pile are passed into contact over a source of vacuum. In the embodiment shown, this is an inverted vacuum plate 68 which pulls the carpet pile 14 of the primary backing 12 for subsequent collection as generally indicated by the arrow 70 in FIG. 3. Any remaining particles of binder 16 are then dropped into a collection unit (not shown). The separated primary backing 12 is then optionally washed and passed on to a collection spool, the latter steps not being schematically illustrated in FIG. 3.

As further steps, the composition may be applied pressurably to the carpet. Further, the carpet may be passed through the system a second time, when required.

In addition to the above, the spent composition may be reused by recycling the same subsequent to filtering the spent composition. Further, the composition may be purified by distillation or other well-known chemical purification techniques.

Other materials may be combined with the composition to enhance softening or swelling of the binder.

The following examples, while not intended to limit the scope of the present invention, serve to further illustrate and describe its benefits.

EXAMPLES 1–9

I. Composition Preparation

Compositions for use in the process of the present invention were formulated according to the specifications set forth in Table 1 below.

TABLE 1

Compositions

| Item No. | Chemical Softening Agent Wt % of Composition | Water Wt % of Composition |
|---|---|---|
| 1 | dimethyl adipate, 100% | 0% |
| 2 | dimethyl adipate, 50% | 50% |
| 3 | dimethyl succinate, 100% | 0% |
| 4 | dimethyl succinate, 50% | 50% |
| 5 | dimethyl glutarate, 100% | 0% |
| 6 | dimethyl glutarate, 50% | 50% |
| 7 | dimethyl adipate, 23–27% dimethyl glutarate, 72–76% | 0% |
| 8 | dimethyl adipate, 12–14% dimethyl glutamate, 36–38% | 50% |

II. Carpet Treatment Procedure 2-inch (5.08 cm) by 2-inch (5.08 cm) samples of a conventional carpet construction having tufts, a primary backing, a styrene-butadiene rubber latex adhesive and a secondary backing were partially immersed in one of the composition items in Table 1 at ambient temperature. For each composition item, the composition amounts tested were 5 ml, 7 ml and 10 ml. For each amount tested, the immersion times tested were 5 minutes, 60 minutes and 18 hours. Control samples were left untreated.

II. Tuft Removal Test

The samples, including the controls, were then tested to determine the force required to remove a tuft from the sample. Each sample was immobilized and any excess composition removed. The tip of an individual tuft was then grasped with a clamp and pulled on until it was removed from the carpet sample without breaking. The clamp was connected to a conventional INSTRON® testing device which measured the maximum pulling force exerted on the tuft by the clamp during its removal from the carpet sample. Three individual tufts from each sample were tested in this manner and an arithmetic average force (F) for each sample was calculated. A force reduction percentage versus the control was also calculated as $$\%\Delta F=[(F_{control}-F)/F_{control}]\times 100\%$$

The results are set forth below in Table 2, with item numbers corresponding to those provided in Table 1.

TABLE 2

| Item No. | Force Reduction % (% ΔF from Control) |
|---|---|
| 1 | 67.8 |
| 2 | 75.0 |
| 3 | 57.1 |
| 4 | 78.6 |
| 5 | 57.1 |
| 6 | 78.6 |
| 7 | 71.4 |
| 8 | 78.6 |
| Control (Untreated Samples) | 0 |

As shown above, the process of the present invention reduced the force required for tuft removal at least 50% and for some items as much as 75% or more.

EXAMPLES 10–14

For examples 10–14, compositional items 2, 4, 6, and 8 from Table 1 were utilized in test procedures identical to those set forth in Examples 1–9 except that the treatment of the carpet sample was conducted at a temperature of 50° C.

The results are set forth below in Table 3.

TABLE 3

| Test Item No. | Composition Item No. | % ΔF from Control |
|---|---|---|
| 10 | 2 | 82.1 |
| 11 | 4 | 89.3 |
| 12 | 6 | 85.7 |
| 13 | 8 | 78.6 |
| 14 | Control (Untreated Samples) | 0 |

As shown above, the presence of heat in the contacting step of the process of the present invention further reduces the force required for tuft removal.

EXAMPLE 15

A carpet sample of nylon 6,6 pile, polypropylene primary and secondary backings and styrene butadiene rubber (SBR)-based binder (75% calcium carbonate, 25% SBR) was procured. The sample was converted into a reduced carpet material by simple cutting of the larger carpet into small pieces which varied in size and shape but which had an approximate average size of about one square inch. As the goal of this particular procedure was to obtain 99.9%+ pure nylon 6,6, the nylon 6,6 pile material (tufts) was separated from the reduced carpet material for further processing (sample #1). The portion of the pile material which included binder attached thereto was then separated from the remaining pile material by cutting (sample #2). By visual inspection, this binder-encrusted pile material included about 50% pile and 50% encrusted binder. The combining step was then performed by adding about 10 g of the encrusted pile material to about 500 ml of a dimethyl ester mixture including dimethyl adipate, dimethyl glutarate and dimethyl succinate heated to 85° C. Shear forces are then applied to the composition/material mixture under turbulent conditions for five minutes utilizing a commercially available blending device (WARING®) set at high speed.

The composition was then drained off to obtain a wet mass of the pile material (sample #3). This wet mass was dried at an elevated temperature and washed with a methanol.

The various materials obtained throughout this process, identified above as numbered samples, were then analyzed for binder content by an ash test wherein the nylon was subjected to a temperature of about 800° C. for one hour and the amount of remaining calcium carbonate converted to calcium oxide was measured. Ash content for the various materials was measured as shown in Table 4 below.

TABLE 4

| | Material Description | % Ash | % $CaCO_3$ | % SBR* |
|---|---|---|---|---|
| 1 | Uncut Pile Material with Latex | 14.0 | 24.84 | 8.28 |
| 2 | Cut Pile Material with Latex | 28.0 | 49.82 | 16.61 |
| 3 | Treated, Unwashed Pile Material | 0.14 | 0.11 | 0.04 |
| 4 | Treated, Washed Pile Material | 0.08 | 0 | 0 |

*This calculation assumes a pile $TiO_2$ concentration of 0.08% by weight. Higher $TiO_2$ concentrations in the pile, while possible, would lower the calculated % SBR value. The exact % SBR value may actually be lower and the value provided is therefore a maximum for that sample.

Some of the processed pile material was also inspected under a high-power microscope for the presence of the SBR.

The results of the visual inspection correlated with the results of the ash test above.

From these results, it will be clear to one of ordinary skill in the art that the present process is particularly useful for recovery of high purity (99%+) pile material from carpet.

Although embodiments of the invention have been described in detail herein, it will be appreciated by those skilled in the art that numerous modifications may be made invention without departing from the intended scope of the invention.

We claim:

1. A process for reclaiming carpet components, said carpet including a backing and carpet pile disposed within said backing and secured to said backing with a binder, said process comprising:
   (a) reducing the size of said carpet to form a reduced carpet material including pile material, backing material and binder material attached to at least one of said pile material and backing material;
   (b) combining at least a portion of the reduced carpet material with a composition including a chemical softening agent for the binder to form a mixture; and
   (c) applying to the mixture shear forces under turbulent conditions in an amount sufficient to promote detachment of the binder from at least one of said pile material and said backing material.

2. The process of claim 1 further including separating said reduced carpet materials into a first stream comprising primarily pile material and a second stream comprising primarily backing material.

3. The process of claim 2 wherein said separating step is performed prior to said combining step.

4. The process of claim 1 wherein said chemical softening agent comprises at least one dimethyl ester.

5. The process of claim 4 wherein said dimethyl ester is selected from the group consisting of dimethyl adipate, dimethyl glutarate, dimethyl succinate, and mixtures thereof.

6. The process of claim 4 wherein said composition further comprises water.

7. The process of claim 6 wherein said contacting step is conducted at a temperature of at least 35° C.

* * * * *